(12) United States Patent
Glasser et al.

(10) Patent No.: US 6,488,237 B1
(45) Date of Patent: Dec. 3, 2002

(54) PROPELLANT CROSS-FEED SYSTEM AND METHOD

(75) Inventors: Sidney P. Glasser, Fullerton, CA (US); Charles J. Sosa, Costa Mesa, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/966,899

(22) Filed: Sep. 28, 2001

(51) Int. Cl.[7] .............................. F02K 9/60; B64G 1/14
(52) U.S. Cl. .......................................... 244/172; 60/224
(58) Field of Search ...................... 244/135 R, 158 R, 244/172; 60/224, 263

(56) References Cited

U.S. PATENT DOCUMENTS

| | | | | |
|---|---|---|---|---|
| 3,311,130 A | * | 3/1967 | Caldwell | 137/869 |
| 4,802,639 A | * | 2/1989 | Hardy et al. | 244/2 |
| 5,203,844 A | * | 4/1993 | Leonard | 244/158 R |
| 5,217,187 A | * | 6/1993 | Criswell | 244/158 R |

* cited by examiner

Primary Examiner—Robert P. Swiatek
(74) Attorney, Agent, or Firm—Alston & Bird LLP

(57) ABSTRACT

A propellant cross-feed system of the present invention for use with a two-stage rocket. The rocket (or reusable launch vehicle) includes a booster and an orbiter. The booster includes a booster propellant tank that is connected to a booster engine by a booster feed line. The orbiter includes an orbiter propellant tank that is connected to an orbiter engine by an orbiter feed line. Each propellant tank supplies propellant through its respective feed line to its respective engine. The cross-feed system includes a cross-feed line that connects the booster feed line to the orbiter feed line, thereby allowing propellant flow from the booster tank to the orbiter engine for parallel (simultaneous) engine burn. Cross-feed propellant flow is managed by a low pressure, cross-feed check valve that is responsive to propellant flow rate changes that occur as a result of the motorized operation of a switch-over valve.

26 Claims, 2 Drawing Sheets

PROPELLANT CROSS-FEED SYSTEM AND METHOD

FIELD OF THE INVENTION

The present invention relates to the use of propellant feed systems in the aerospace field, and more particularly to a system and method of controlling propellant cross-feed between a booster and an orbiter of a two-stage rocket.

BACKGROUND OF THE INVENTION

Increasing the thrust to weight ratio (T/W) of a rocket (or other type of launch vehicle) can result in a concomitant increase in the payload capability, or performance, of the rocket. In general, the thrust to weight ratio of the rocket may be increased by decreasing the weight of the rocket and/or increasing the thrust of the rocket. Two-stage rockets typically have two-stage propellant burn, a booster stage and a continuing (orbiter) stage. The booster stage is generally provided by a booster that includes booster engines that are connected to a booster tank using a booster feed line. Similarly, the orbiter stage is typically provided by an orbiter that includes orbiter engines that are connected to an orbiter tank using an orbiter feed line. Each engine is fed propellant for combustion from its respective tank and through its prospective feed line. During launch, the booster bums during the first, booster stage until a disconnect sequence is initiated. Then, the orbiter ignites and separates from the booster to begin the continuing stage, burning until the orbiter reaches orbit.

For the typical two-stage rocket, much of the thrust of the booster is devoted to supporting the weight of the vehicle. As the early trajectory of the rocket is nearly vertical to the Earth's surface, the weight of the vehicle results in significant gravity losses. Increasing the T/W well above 1.0 minimizes the effect of such gravity losses until the rocket is in a flight path more nearly horizontal to the Earth's surface. Once in a more horizontal trajectory, the thrust of the orbiter may be more effectively used to increase velocity rather than fight gravity. Additional booster engines, or larger booster engines, could increase the amount of thrust available but are generally undesirable due to the cost and additional weight of the engines.

A cross-feed system used with the two-stage rocket can significantly increase payload capacity by "borrowing" the orbiter engine to increase the T/W during the boost phase using propellant supplied from the booster. Conventional propellant cross-feed systems include a cross-feed line connecting the booster and orbiter feed lines. The cross-feed system allows both the booster and orbiter engines to burn simultaneously during the booster stage so as to increase thrust. The additional thrust allows the orbiter to overcome gravity losses that are incurred during the early flight period. The borrowed orbiter engine is transferred back to the orbiter near the end of the boost phase. The still-firing orbiter engine propels the orbiter back into orbit using propellant from the orbiter tanks. Advantageously, the propellant cross-feed system promotes a more efficient overall use of propellant as the more efficient orbiter engines burn for the longest time. A more efficient use of propellant reduces the amount of propellant that must be carried by the rocket, thereby reducing the weight of the rocket.

Some cross-feed systems include several motorized valves that facilitate the transition from cross-feed to continuing stage operation. In one prior art system, the cross-feed system includes a cross-feed line having a motorized closing valve and an open-latched, swing pivot valve. Also, the orbiter feed line includes a second motorized valve for controlling propellant supply to the continuing engine. The latched open swing pivot valve is on the orbiter side and when unlatched will close off to seal the cross-feed line for separation. The two motorized valves of the cross-feed system allow the engines to consume propellant from only the booster tanks during the first part of the ascent mission. However, the motorized valves must be stringently timed and sequenced to avoid significant propellant flow back to the booster and to avoid starving the orbiter engine(s) during the transition phase. Such timing or sequencing requirements may pose reliability problems. In addition, the more complex, moving parts a system has, the greater the chance of reliability problems. Reliability is a highly sought-after feature in aerospace applications.

Therefore, it would be advantageous to have a propellant cross-feed system that increases the performance of a rocket by increasing the thrust-to-weight ratio. It would be further advantageous to have a propellant cross-feed system with fewer moving or complex parts and therefore a higher reliability. It would also be advantageous, if the propellant cross-feed system minimized timing and sequencing problems.

SUMMARY OF THE INVENTION

The present invention addresses the above needs and achieves other advantages by providing a propellant cross-feed system and method for supplying a propellant which is burned by a booster and orbiter engines of a rocket. The cross-feed system includes a cross-feed line connecting a booster supply line for supplying propellant to the booster engine and an orbiter supply line for supplying propellant to the orbiter engine. The cross-feed line allows propellant to flow from the booster supply line to the orbiter supply line. Propellant flow to the orbiter supply line allows the orbiter engines to burn in parallel with the booster stage engines. Backflow of propellant from the orbiter to the booster is limited by a low pressure drop check valve that closes when pressure in the orbiter line is higher than the booster line. The flow of propellant in the orbiter line is controlled by a motorized switch-over valve that opens slowly during the process of switching over from the booster stage to the continuing stage. As the flow in the orbiter line is increased, the pressure at the orbiter end of the cross-feed line also increases, causing the low pressure drop check valve to progressively close. Advantageously then, the low pressure drop check valve responds to control of the switch-over valve, obviating the need for complex valve control and sequencing schemes.

In one embodiment, the present invention includes a two-stage rocket having a booster and an orbiter, the two-stage rocket also having a propellant cross-feed system capable of supplying propellant simultaneously to both the booster and the orbiter. The rocket includes a booster and orbiter propellant tanks each capable of containing a reservoir of propellant. The booster and orbiter engines are each capable of burning the propellant and producing thrust. The rocket further includes a booster supply line connecting in fluid communication the booster propellant tank to the booster engine. The booster supply line supplies the propellant at a flow rate to the booster engine. An orbiter supply line connects in fluid communication the orbiter propellant tank to the orbiter engine. The orbiter supply line supplies the propellant at a flow rate to the orbiter engine. The rocket also includes a cross-feed system. The cross-feed system includes a switch-over valve connected to the orbiter supply line. The switch-over valve controls the flow rate of the propellant in the orbiter supply line. The cross-feed system also includes a cross-feed line connecting the booster supply line and the orbiter supply line in fluid communication. The cross-feed line has a first pressure at its booster end and a second pressure at its orbiter end. The cross-feed line includes a low pressure drop check valve configured to begin closing as the second pressure exceeds the first pressure. An increase in the flow rate of the propellant in the orbiter supply line by the switch-over valve results in an increase of the second pressure so as to begin closing the low pressure drop valve. Closing of the low pressure drop check valve inhibits the flow of the propellant from the orbiter supply line to the booster supply line.

In another embodiment, the low pressure drop check valve is a swing check valve. The swing check valve can be oriented so that gravity closes the valve during non-operating periods. In another aspect, the swing check valve is partially counterbalanced so as to be responsive to low pressure changes. A stop may be positioned near the swing check valve so as to prevent the swing check valve from fluttering when opened. Alternatively, the low pressure drop check valve may be a flapper check valve, or some type of check valve other than a swing check valve.

In another embodiment, the switch-over valve is a motorized valve that is closed during ground operations, and remains closed until near the end of the boost phase. The motorized valve operates slowly, with a traverse time on the order of about 5 seconds. Opening of the switch-over valve is initiated by a liquid level sensor in the booster propellant tank that signals propellant is nearing depletion.

In yet another embodiment, the cross-feed line includes a pair of separation disconnect valves and a pair of redundant shutoff valves. The swing check valve includes a closing switch positioned to be activated when the swing check valve is in the closed position. The closing switch activates closure of the redundant shutoff valves. A thrust termination signal from the booster causes closure of the separation disconnect valve and physical separation of the booster from the orbiter.

The present invention has several advantages. By maximizing propellant usage, the propellant cross-feed system can result in a rocket launch vehicle weight reduction on the order of 25% for a given payload weight. Alternatively, maximizing propellant usage allows an existing rocket launch vehicle to carry a heavier payload. The cross-feed system provides a steady flow of propellant to the orbiter engine through all phases of the flight from liftoff to orbiter shutdown. The operation of the propellant cross-feed system ensures that the orbiter propellant tank is nearly full after detachment from the booster, thereby enabling efficient use of the orbiter propellant. The cross-feed system and operation are relatively simple, which contributes to the high reliability required for rocket launch vehicles. Automatic closure of the of the low pressure drop check valve in response to increasing flow through the switch-over valve eliminates the need for the complex control of sequencing and timing typically required in systems with multiple motor-operated valves. The relatively slow opening speed of the. switch-over valve minimizes waterhammer effects as the orbiter engine flow is transitioned from the booster tank to the orbiter tank. Also, inasmuch as the flow through the cross-feed line is essentially zero when the switch in the check valve activates the redundant shutoff valves, rapid closure of the redundant shutoff valves will not generate any waterhammer effects.

BRIEF DESCRIPTION OF THE DRAWINGS

Figure 1:
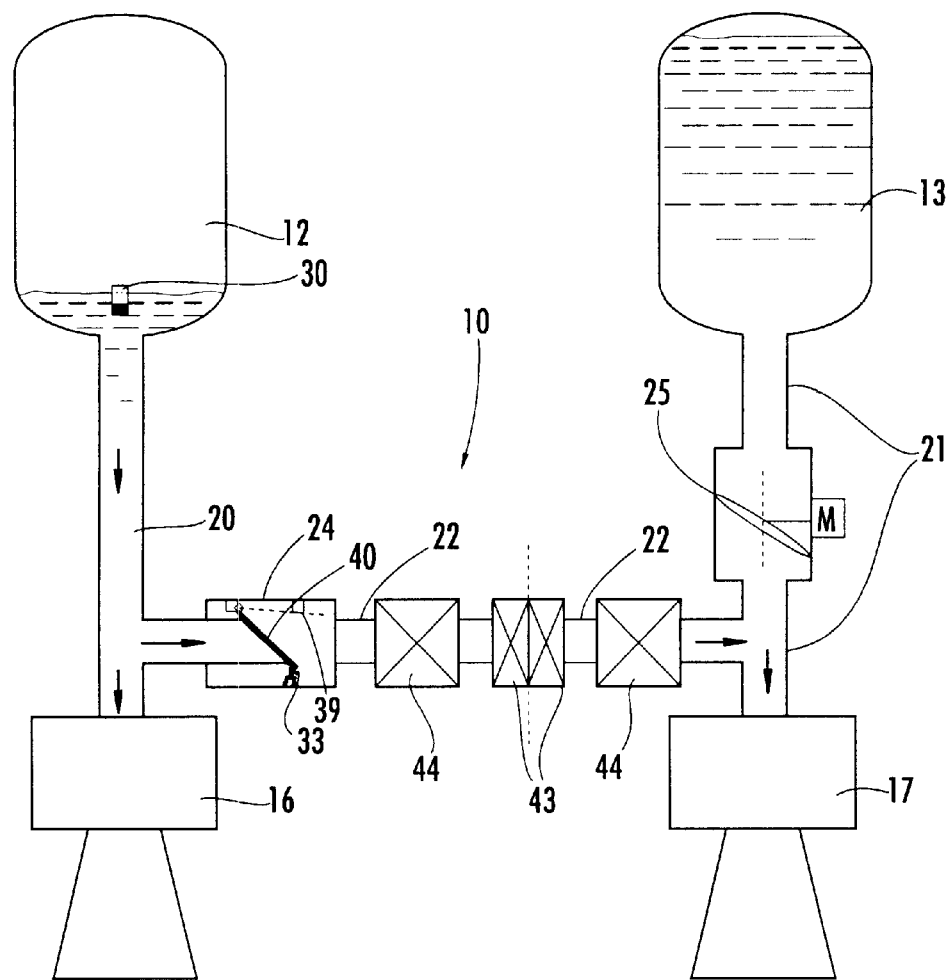
Figure 2:
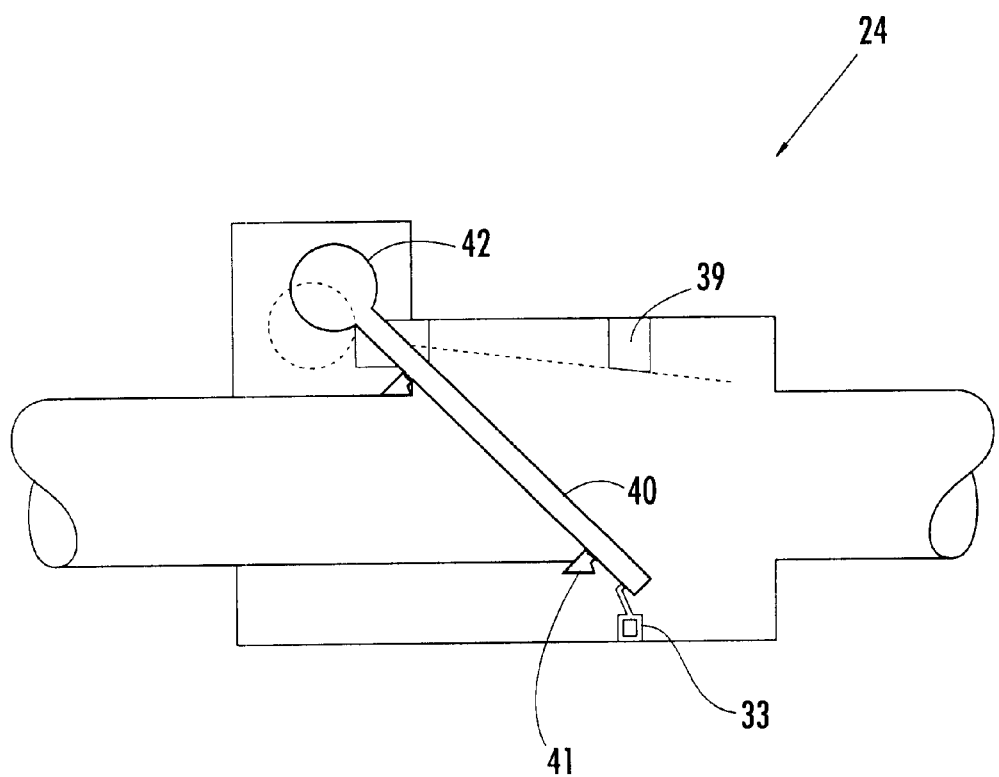

Having thus described the invention in general terms, reference will now be made to the accompanying drawings, which are not necessarily drawn to scale, and wherein:

FIG. 1 is a schematic of one embodiment of the propellant cross-feed system of the present invention; and FIG. 2 is a schematic of a counterbalanced flapper valve of another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A propellant cross feed system 10 of the present invention for use with a two-stage (booster and orbiter) rocket or reusable launch vehicle, is shown in FIG. 1. The reusable launch vehicle includes a booster and an orbiter. The booster includes a booster propellant tank 12 that is connected to a booster engine 16 by a booster feed line 20. The orbiter includes an orbiter propellant tank 13 that is connected to an orbiter engine 17 by an orbiter feed line 21. Each propellant tank supplies propellant through its respective feed line to its respective engine. The cross-feed system 10 includes a cross-feed line 22 that connects the booster feed line 20 to the orbiter feed line 21, thereby allowing propellant flow from the booster tank 12 to the orbiter engine 17 for parallel (simultaneous) engine burn. Cross-feed propellant flow is managed by a low pressure drop, cross-feed check valve 24 (shown in FIG. 1) that is responsive to propellant flow rate changes that occur as a result of the motorized operation of a switch-over valve 25.

The booster and orbiter propellant tanks 12, 13 preferably contain liquid $H_2$ or liquid $O_2$ as a propellant. However, the present invention is applicable to other propellant combinations used in rocket, aerospace and other propulsion systems. Preferably the propellant tanks are low pressure propellant tanks, by way of example and not by limitation, the low pressure propellant tanks typically hold propellant at between 20 to 40 psia. Also, the propellant tanks are preferably positioned above the engines for gravity-feed of the propellant to the engines. Preferably the booster tank includes liquid level sensor 30 that senses the level of the liquid propellant in the booster tank. Although a preferred embodiment, the use of two propellant tanks 12, 13 as described above should not be considered to limit the cross-feed system of the present invention. A different number of tanks could be used for different types of launch vehicles, or aerospace vehicles. For instance, a pair of booster tanks could feed the booster engine through the single booster feed line 20, such as by using several inlets along the line.

The booster and orbiter engines 16, 17 burn the propellant supplied by each respective feed line 20, 21 from each respective propellant tank 12, 13, as shown in FIG. 1. Burning the propellant produces thrust that allows the launch vehicle to overcome the pull of gravity and achieve orbit. The booster and orbiter stage engines may be started concurrently or sequentially, as desired. Preferably, the booster and orbiter have multiple engines, but could each have a single engine, depending upon the rocket type. As discussed above, the multiple engines could also be fed propellant from multiple respective feed lines connected to respective master feed lines 20, 21 downstream of the propellant cross-feed system. The construction of the booster and orbiter feed lines 20, 21 is known in the art and therefore not discussed herein in additional detail.

The cross-feed line 22 connects the booster and orbiter feed lines 20, 21 so as to allow propellant flow to the orbiter from the booster. The cross-feed check valve 24 is a low pressure check valve the mediates the flow of propellant through the cross-feed line 22. Preferably, the cross-feed check valve is a swing check valve, as shown in FIG. 1. The swing check valve is oriented so that gravity keeps a flapper 40 of the check valve against a seat 41 of the check valve during non-operating periods, as also shown in FIG. 1. When fully open, the flapper 40 abuts a stop 39. Flapper check valves are inherently low pressure drop check valves and are preferred for the present invention due to their simplicity. However, other low pressure drop check valves could be used such as a spring-loaded flapper valve or a double flapper check valve.

The pressure drop required to open the cross-feed check valve 24 can be reduced further by the addition of a counterweight 42, as shown in the embodiment of FIG. 2. The counterweight preferably partially counterbalances the flapper 40, so that gravity and/or acceleration forces urge the check valve 24 into the closed position against the seat 41. In addition, the cross-feed check valve 24 preferably includes a switch 33 that is activated by closure of the flapper 40. The cross-feed line 22 also preferably includes a pair of separation disconnect valves 43 and a pair of redundant shutoff valves 44 that block flow through the cross-feed line 22.

During the cross-feed transition or termination period, the pressure at the orbiter end of the cross-feed line must be greater than the pressure at the booster end of the cross-feed line. The pressures at the two ends of the cross-feed line reflect ullage pressures, hydrostatic heads and friction pressure drops. For liquid $O_2$, the pressure in the booster end of the cross-feed line is greater during the transition period due to the fact that the booster tank 12 is nearing depletion and the orbiter tank 13 is nearly full. For liquid $H_2$, the hydrostatic heads are normally low because of the low density of the propellant. The relative feed line pressure requirement for $H_2$, and other propellant types if needed, can be satisfied by adjustment of the ullage pressures.

The cross-feed switch-over valve 25 is preferably a butterfly-type valve that is motor operated, as shown in FIG. 1. The switch-over valve is also preferably capable of opening and closing slowly, with a traverse time on the order of 5 seconds. Slower, or faster, traverse times are possible, as desired. For slow operation, the motor of the switch-over valve should be capable of operating at a controlled speed and can include electric, hydraulic, pneumatic or other types of drives.

Before launch begins, both the booster propellant tank 12 and the orbiter propellant tank 13 are full. The separation disconnect valves 43 and the redundant shutoff valves 44 are open, and the switch-over valve 25 is closed. The engines of the booster and orbiter are thermally preconditioned by propellant from the booster tank. Depending upon the cracking pressure of the cross-feed check valve 24, the preconditioning flow flows through the check valve, or an auxiliary bypass valve (not shown).

The booster and orbiter engines 16, 17 are started concurrently, or sequentially, as desired. After the orbiter engine 16 is started, the pressure of propellant flow keeps the flapper 40 of the check valve 24 against its stop 39 until the cross-feed termination sequence. During boost the booster and orbiter engines operate in tandem while using propellant from the booster propellant tank 12. When the liquid level in the booster tank reaches the liquid level sensor 30, the cross-feed termination sequence is initiated as the cross-feed switch-over 25 starts opening under control of a motor. As the switch-over valve begins to open, the pressure in the orbiter feed line 21 upstream is greater than the pressure in the booster feed line 20.

Progressively more of the orbiter engine 17's propellant requirement is supplied from the orbiter tank 13 causing an equal reduction in flow from the booster as the motor-operated switch-over valve 25 opens. The reduced velocity of the propellant from the booster in the cross-feed line 22 causes the flapper 40 of the check valve 24 to progressively drift to the closed position as the proportion of flow from the orbiter tank 13 increases. At some point in the motor operated switch-over valve 25's travel all of the propellant flow to the orbiter engine 17 comes from its own orbiter tank 13 and the check valve 24 is in the closed position. Snug closure of the check valve 24 is assured by the additional propellant pressure from further opening of the switch-over valve 25.

The switch 33 of the check valve 24, shown in FIG. 1, is tripped as the flapper 40 of the check valve rotates into the closed position. Tripping of the switch 33 initiates closure of the redundant shutoff valves 44. Velocity of the propellant flow in the cross-feed line 22 is at zero due to closure of the check valve 24, preventing waterhammer during rapid closure of the shutoff valves 44. Closure of the redundant shutoff valves 44 causes a total separation of the propellant feed systems of the booster and orbiter. The booster continues firing in tandem with the orbiter until it receives a cutoff signal indicating thrust termination of the booster engine. Separation of the booster and orbiter is initiated when the booster engines 16 are completely shut down. Separation results in the closure of the separation disconnect valves 43 which completes the redundant shutoff of the propellant systems of both the booster and the orbiter. After separation, the orbiter (continuing) stage continues on its mission with nearly full propellant tanks 13.

The propellant cross-feed system is applicable to either manned, or unmanned vehicles. In unmanned vehicles the level of redundancy is typically less and the valves 43 may not be required. Also, the cross-feed check valve 24 could be incorporated into the orbiter where it would serve as a closure device by replacing the disconnect valves on the orbiter side.

The term "rocket" is used herein to indicate any type of aerospace vehicle, including, but not limited to, reusable launch vehicles, aircraft and multiple stage vehicles.

The propellant cross-feed system 10 of the present invention has several advantages. By maximizing propellant usage, the propellant cross-feed system can result in a rocket launch vehicle weight reduction on the order of 25% for a given payload weight. Alternatively, maximizing propellant usage allows an existing rocket launch vehicle to carry a heavier payload. The cross-feed system provides a steady flow of propellant to the orbiter engine 17 through all phases of the flight from liftoff to orbiter shutdown. The operation of the propellant cross-feed system ensures that the orbiter propellant tank 13 is nearly full after detachment from the booster, thereby enabling efficient use of the orbiter propellant. The cross-feed system 10 and operation are relatively simple, which contributes to the high reliability required for rocket launch vehicles. Automatic closure of the of the low pressure drop check valve 24 in response to increasing flow through the switch-over valve 25 eliminates the need for complex control of sequencing and timing typically required in systems with multiple motor-operated valves. The relatively slow opening speed of the switch-over valve minimizes waterhammer effects as the orbiter engine flow is transitioned from the booster tank 12 to the orbiter tank 13. Also, inasmuch as the flow through the cross-feed line 22 is essentially zero when the switch 33 in the check valve 24 activates the redundant shutoff valves 44, rapid closure of the redundant shutoff valves will not generate any waterhammer effects.

Many modifications and other embodiments of the invention will come to mind to one skilled in the art to which this invention pertains having the benefit of the teachings presented in the foregoing descriptions and the associated drawings. For instance, the present invention could also be used to establish cross-feed amongst three, or more, stage launch or aerospace vehicles by using multiple low pressure drop check valves and motorized valves. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A two-stage rocket having a booster and an orbiter, the two-stage rocket capable of supplying propellant simultaneously to both the booster and the orbiter, the rocket comprising:
   a booster and orbiter propellant tanks each configured to contain a reservoir of the propellant;
   a booster and orbiter engines each configured to burn the propellant and produce thrust;
   a booster supply line connecting in fluid communication the booster propellant tank to the booster engine and supplying the propellant to the booster engine;
   an orbiter supply line connecting in fluid communication the orbiter propellant tank to the orbiter engine and supplying the propellant at a flow rate to the orbiter engine; and
   a cross-feed system comprising:
      a cross-feed line connecting the booster supply line and the orbiter supply line in fluid communication, the cross-feed line having a first pressure at its booster end and a second pressure at its orbiter end, the cross-feed line including a low pressure drop check valve configured to begin closing as the second pressure exceeds the first pressure; and
      a switch-over valve connected to the orbiter supply line and operable to increase the flow rate of the propellant in the orbiter supply line resulting in an increase of the second pressure so as to cause the low pressure drop check valve to close and inhibit flow of the propellant from the orbiter supply line to the booster supply line.

2. A rocket of claim 1, wherein the low pressure drop check valve is a swing check valve.

3. A rocket of claim 2, wherein the swing check valve is oriented such. that gravity closes the valve during non-operating periods.

4. A rocket of claim 2, further comprising a stop positioned so as to prevent the swing check valve from fluttering.

5. A rocket of claim 2, wherein the swing check valve is partially counterbalanced.

6. A rocket of claim 1, wherein the cross-feed line further includes a pair of redundant shutoff valves.

7. A rocket of claim 6, wherein the swing check valve includes a closing switch positioned to be activated when the swing check valve is in the closed position and wherein the pair of redundant shutoff valves are responsive to the closing switch.

8. A rocket of claim 1, wherein the switch-over valve is a motor-operated valve.

9. A rocket of claim 8, wherein the traverse time of the motor-operated valve is about 5 seconds.

10. A rocket of claim 1, wherein the booster stage propellant tank includes a liquid level sensor operable to control closing of the switch-over valve.

11. A cross-feed system for supplying propellant simultaneously to both a booster and an orbiter of a two-stage rocket, the booster and orbiter each including a propellant tank, an engine and a supply line for supplying propellant from the tank to the engine for burning to produce thrust, the cross-feed system comprising:
   a cross-feed line connecting the booster supply line and the orbiter supply line in fluid communication, the cross-feed line having a first pressure at its booster end and a second pressure at its orbiter end, the cross-feed line including a low pressure drop check valve configured to begin closing as the second pressure exceeds the first pressure; and
   a switch-over valve connected to the orbiter supply line and operable to increase a flow rate of the propellant in the orbiter supply line resulting in an increase of the second pressure so as to cause the low pressure drop check valve to close and inhibit flow of the propellant from the orbiter supply line to the booster supply line.

12. A cross-feed system of claim 11, wherein the low pressure drop check valve is a swing check valve.

13. A cross-feed system of claim 12, wherein the swing check valve is oriented such that gravity closes the valve during non-operating periods.

14. A cross-feed system of claim 12, further comprising a stop positioned so as to prevent the swing check valve from fluttering.

15. A cross-feed system of claim 12, wherein the swing check valve is partially counterbalanced.

16. A cross-feed system of claim 11, wherein the cross-feed line further includes a pair of redundant shutoff valves.

17. A cross-feed system of claim 16, wherein the swing check valve includes a closing switch positioned to be activated when the swing check valve is in the closed position and wherein the pair of redundant shutoff valves are responsive to the closing switch.

18. A cross-feed system of claim 11, wherein the switch-over valve is a motor-operated valve.

19. A rocket of claim 18, wherein the traverse time of the motor-operated valve is about 5 seconds.

20. A method of supplying propellant to a booster engine and an orbiter engine of a rocket for combustion, the method of supplying propellant comprising:
   providing a booster and orbiter propellant tanks containing a reservoir of propellant;
   supplying the propellant to the booster engine using a booster supply line connecting the booster propellant tank to the booster engine;
   supplying the propellant to the orbiter engine using a cross-feed line to cross-feed propellant from the booster supply line to an orbiter supply line connecting the orbiter propellant tank to the orbiter engine;

increasing a flow rate of the propellant in the orbiter supply line by opening a switch-over valve connected to the orbiter supply line; and inhibiting the cross-feed of propellant from the orbiter supply line to the booster supply line using a low pressure drop check valve connected to the cross-feed line by allowing the low pressure drop check valve to close as a second pressure at an orbiter end of the cross-feed line exceeds a first pressure at a booster end of the supply line in response to the increase in the flow rate in the orbiter supply line.

21. A method for supplying propellant of claim 20, wherein increasing the flow rate includes slowly increasing the flow rate by slowly opening the switch-over valve with a motor.

22. A method for supplying propellant of claim 21, wherein allowing the low pressure drop check valve to close includes slowly allowing the low pressure drop check valve to close in response to the slowly increasing flow rate in the orbiter feed line.

23. A method for supplying propellant of claim 21, wherein slowly opening the switch-over valve includes opening the switch-over valve over a period of about 5 seconds.

24. A method for supplying propellant of claim 23, wherein allowing the low pressure drop check valve to close includes slowly allowing the low pressure drop check valve to close over the period of about 5 seconds in response to the slowly increasing flow rate in the orbiter feed line.

25. A method for supplying propellant of claim 20, further comprising sensing a level of depletion of propellant in the booster tank using a sensor before increasing the flow rate.

26. A method for supplying propellant of claim 20, further comprising sensing closure of the low pressure drop check valve with a switch and closing a plurality of redundant shutoff valves to further inhibit cross-feeding of the propellant.

* * * * *

UNITED STATES PATENT AND TRADEMARK OFFICE
CERTIFICATE OF CORRECTION

PATENT NO. : 6,488,237 B1
DATED : December 3, 2002
INVENTOR(S) : Glasser et al.

It is certified that error appears in the above-identified patent and that said Letters Patent is hereby corrected as shown below:

Title page,
Item [56], References Cited, insert the following:

-- OTHER PUBLICATIONS
Charles J. Sosa, James W. Howarth, Michael V. Merlin, Stephen P. Petrilla and Seshagirirao V. Vaddey; Design and Integration of a Cryogenic propellant Crossfeed System for Parallel Burn Vehicles; American Institute of Aeronautics and Astronautics, Inc.; June 28-30, 1993; --.

Column 7,
Line 62, after "such" cancel the period (.).

Signed and Sealed this

Twenty-ninth Day of April, 2003

JAMES E. ROGAN
*Director of the United States Patent and Trademark Office*